United States Patent
Shimomura

(10) Patent No.: US 7,710,244 B2
(45) Date of Patent: May 4, 2010

(54) REMOTE ENGINE STARTING SYSTEM AND METHOD

(75) Inventor: Toshio Shimomura, Chiryu (JP)

(73) Assignee: DENSO Corporation, Kariya (JP)

( * ) Notice: Subject to any disclaimer, the term of this patent is extended or adjusted under 35 U.S.C. 154(b) by 286 days.

(21) Appl. No.: 11/826,753

(22) Filed: Jul. 18, 2007

(65) Prior Publication Data

US 2008/0055057 A1 Mar. 6, 2008

(30) Foreign Application Priority Data

Sep. 1, 2006 (JP) .............................. 2006-237765

(51) Int. Cl.
*B60R 25/10* (2006.01)
(52) U.S. Cl. .............................. 340/426.13; 340/426.11
(58) Field of Classification Search ............ 340/426.13, 340/426.11, 539.1; 307/10.1, 10.3
See application file for complete search history.

(56) References Cited

U.S. PATENT DOCUMENTS

| | | | | |
|---|---|---|---|---|
| 5,276,728 A | * | 1/1994 | Pagliaroli et al. ...... | 340/426.13 |
| 5,331,325 A | * | 7/1994 | Miller .................... | 340/426.13 |
| 5,818,330 A | * | 10/1998 | Schweiger ............. | 340/426.13 |
| 6,639,511 B2 | * | 10/2003 | Haruna et al. .......... | 340/426.13 |
| 6,696,927 B2 | * | 2/2004 | Flick ...................... | 340/426.11 |
| 7,315,242 B2 | * | 1/2008 | Eisenman .............. | 340/426.16 |

FOREIGN PATENT DOCUMENTS

JP 3475769 9/2003

* cited by examiner

*Primary Examiner*—John A Tweel, Jr.
(74) *Attorney, Agent, or Firm*—Nixon & Vanderhye P.C.

(57) ABSTRACT

A remote engine starting system starts an engine when an engine start command signal is transmitted from a remote controller or an ignition key. The system includes an immobilizer ECU, which sets an immobilizer system to prohibit vehicle travel and drives an LED to flash to thereby indicate the vehicle travel prohibition. When the engine is started by the ignition key, the immobilizer system is unset and the LED stops the indication of the vehicle travel prohibition. When the engine is started by the remote controller, the immobilizer system is unset but the LED continues to flash to indicate the vehicle travel prohibition.

13 Claims, 2 Drawing Sheets

REMOTE ENGINE STARTING SYSTEM AND METHOD

CROSS REFERENCE TO RELATED APPLICATION

This application is based on and incorporates herein by reference Japanese Patent Application No. 2006-237765 filed on Sep. 1, 2006.

FIELD OF THE INVENTION

The present invention relates to a remote engine starting system and method for a vehicle.

BACKGROUND OF THE INVENTION

In a conventional remote engine starting system such as disclosed in JP 3,475,769, an immobilizer unit outputs an engine start permission signal to an engine control unit to permit an engine starting, when an engine start command signal is output from an ignition key. The engine is then started when the ignition key is turned to a starter-on position of a starter switch. Further, the immobilizer unit outputs the engine start permission signal to the engine control unit to permit the engine starting, when an engine start command signal is output from a remote controller, which is a portable transmitter. Thus, the engine can be started from an outside of a vehicle.

When the immobilizer unit outputs no engine start permission signal, it normally provides an indication of vehicle travel prohibition to indicate that an immobilizer system for protecting a vehicle from unauthorized use is set in operation. When the immobilizer unit provides its engine start permission signal, it provides no such indication.

Since the indication of vehicle travel prohibition is cancelled and the engine is started in response to the engine start permission signal, the indication is also cancelled and the engine is also started when the remote controller outputs its engine start permission signal. In this occasion, the user of the vehicle may not be present close to the vehicle and may be away from the vehicle until the engine is warmed up sufficiently. It is thus likely that an unauthorized user breaks a window or a door and steals the vehicle.

SUMMARY OF THE INVENTION

It is therefore an object of the present invention to provide a remote engine starting system having improved security.

According to one aspect, a remote engine starting system for a vehicle comprises a first communication device, a second communication device, a control unit and an indication unit. The first communication device receives an engine start command signal from a portable transmitter held by a user. The second communication device receives an engine start command signal from a transmitter provided in a vehicle key. A control unit permits and prohibits an engine starting in response to the engine start command signal. The indication unit indicates a vehicle travel prohibition when the engine starting is prohibited by the control unit. The indication unit provides an indication of the vehicle travel prohibition when the engine is started in response to the engine start command signal received by the first communication device, and stops the indication of the vehicle travel prohibition when the engine is started in response to the engine start command signal received by the second communication device.

According to another aspect, an engine start command signal is transmitted at an outside of a vehicle or at an inside of the vehicle. When the engine start command signal is received in the vehicle, an engine of the vehicle is started, and it is determined whether the engine start command signal is transmitted at the outside of the vehicle or at the inside of the vehicle. Travel of the vehicle is controlled based on a determination result, so that the vehicle travel is prohibited when the determination result indicates that the engine start command is transmitted at the outside of the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
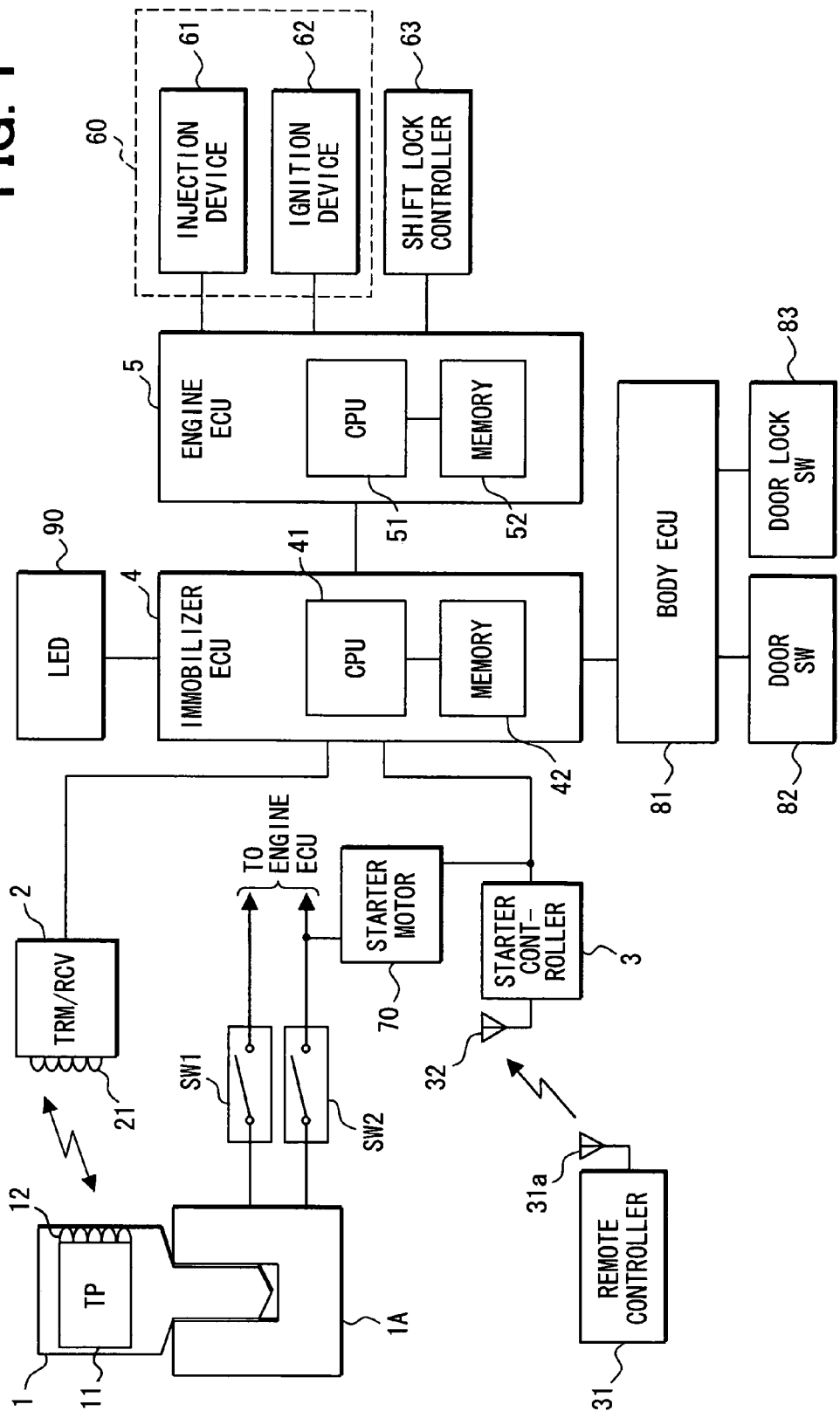
FIG. 1 is a block diagram of a remote engine starting system for a vehicle according to an embodiment of the present invention.

Referring to FIG. 1, a remote engine starting system includes a hand-held ignition key (vehicle key) 1, which is inserted into a key cylinder 1A to operate an engine 60 of a vehicle (not shown). The ignition key 1 houses therein a transponder 11 for communicating with a transmitter/receiver (TRM/RCV) 2 provided in the vehicle and a key antenna 12 connected to the transponder 11. The ignition key 1 further houses therein a power converter (not shown), an EEPROM (not shown) and a transponder control unit (not shown). The transponder 11 receives radio waves transmitted from a vehicle antenna 21 and received by the key antenna 12, and charges a capacitor (not shown) in the power converter. The EEPROM is for storing therein a key identification number (key ID) specific to each ignition key. The transponder control unit is for retrieving the key ID and controlling transmission/reception of radio waves to/from the vehicle antenna 21.

The electric charge stored in the power converter is used as transmission power for transmitting a radio wave from the key antenna 12 or as operation power of the transponder control unit. When the radio wave is transmitted, the key ID is read out from the EEPROM and the radio wave including the key ID is transmitted as an engine start command signal from the key antenna 12 toward the vehicle antenna 21.

The transmitter/receiver 2 includes therein a radio wave transmission/reception switching switch, an oscillator for outputting a carrier wave signal of the transmitted radio wave, a demodulator for demodulating received radio wave received by the vehicle antenna 21, a transmission/reception control unit for controlling radio wave transmission and reception timing, etc.

The key cylinder 1A is provided with an ignition switch SW1 and a starter switch SW2 operated by the ignition key 1. The ignition switch SW1 and the starter switch SW2 are turned on, when the ignition key 1 is inserted into the key cylinder 1A and turned to an ignition-on position IG and to a starter-on position STA, respectively. A starter motor 70 is supplied with electric current when the starter switch SW2 is turned on.

The remote engine starting system further includes a remote engine starter controller 3, which is provided as a first communication device while the transmitter/receiver 2 is provided as a second communication device. The starter controller 3 starts the engine 60 when it receives a radio wave (engine start command signal) including a specific ID from a remote controller 31, which is a portable transmitter, through an antenna 32. When the radio wave is received from the remote controller 31, the engine starter controller 3 checks whether the received ID satisfies a predetermined relation to the stored ID. When the predetermined relation is satisfied, the engine starter controller 3 turns on the ignition (similar to turning on the ignition switch SW1) and supplies the electric current to the starter motor 70. At this time, the engine starter controller 3 outputs a starter signal to an immobilizer electronic control unit (ECU) 4.

The immobilizer ECU 4 includes a central processing unit (CPU) 41 and a memory 42 storing a registered key ID. The immobilizer ECU 4 outputs an engine start permission signal for permitting engine starting and an engine start prohibition signal for prohibiting the engine starting to an engine ECU 5. Thus, the immobilizer ECU 4 functions as an immobilizer system or as a part the immobilizer system.

The CPU 41 of the immobilizer ECU 4 receives a demodulation signal output from the demodulator of the transmitter/receiver 2, and checks whether the key ID included in the demodulation signal satisfies the predetermined relation to the registered key ID stored in the memory 42. When the predetermined relation is satisfied, the CPU 41 outputs the engine start permission signal to the engine ECU 5. The CPU 41 of the immobilizer ECU 4 also receives the starter signal output from the engine starter controller 3, and outputs the engine start permission signal to the engine ECU 5 in response to the starter signal. When the CPU 41 determines that the key ID in the demodulation signal and the registered key ID do not satisfy the predetermined relation, the CPU 41 outputs an engine start prohibition signal to the engine ECU 5.

In this operation, the CPU 41 checks whether the engine start, that is, engine start permission signal, is caused by a user's manipulation of the ignition key 1 or the remote controller 31. This checking results in determining whether the engine start command signal is transmitted at the inside (ignition key 1) or at the outside (remote controller 31). The CPU 41 attaches an identification signal to indicate which one of the ignition key 1 and the remote controller 31 is manipulated to start the engine 60.

The engine ECU 5 includes a CPU 51, a memory 52, etc. to control various operations of the engine 60 by a fuel injection device 61, an ignition device 61 and a shift lock controller 63 of a vehicle transmission. The injection device 61 and the ignition device 62 may be mounted on the engine 60. When the engine start permission signal is applied, the engine ECU 5 drives the injection device 61 and the ignition device 62 to supply the engine 60 with fuel and ignition spark thereby starting the engine 60.

Specifically, the CPU 51 outputs signals to the injection device 61 and the ignition device 62 to start the engine 60 in response to the engine start permission signal from the immobilizer ECU 4. The CPU 51 however prohibits the engine starting in response to the engine start prohibition signal from the immobilizer ECU 4.

The remote engine starting system further includes a body ECU 81, which includes a CPU, a memory, etc. and is connected to a vehicle door switch 82 and a door lock switch 83 to perform door lock control, interior light control and other control. The switches 82 and 83 may be provided in each vehicle door. A light emitting diode (LED) 90 is provided to be turned on or off by the immobilizer ECU 4.

Figure 2:
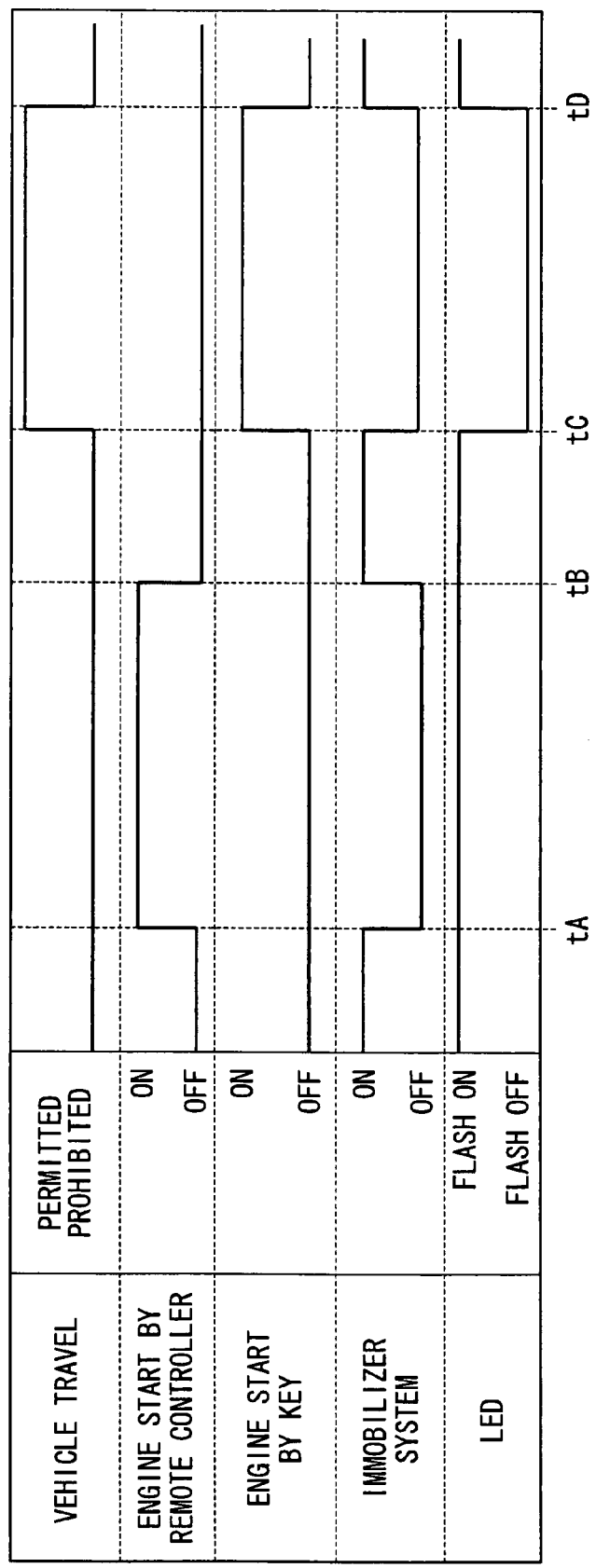
FIG. 2 is a time chart showing operation of the embodiment shown in FIG. 1.

The operation of the remote engine starting system is described next with reference to FIG. 2.

When the ignition key 1 is inserted into the key cylinder 1A and turned to the ignition-on position under a condition that the immobilizer system is in the set condition, that is, the immobilizer ECU 4 outputs the engine start prohibition signal to the engine ECU 5 to prohibit the engine 60 operation and the vehicle travel is prohibited (from time tB to time tC), the ignition switch SW1 is turned on. When the immobilizer system is in the set condition, the immobilizer ECU 4 outputs a command signal to the LED 90 to flash (alternate turn-on and turn-off) for indicating that the immobilizer system is set (ON).

When the ignition switch SW1 is turned on, the transmitter/receiver 2 transmits a radio wave. When this radio wave is received by the ignition key 1, the transponder 11 starts a transmission operation and transmits the engine start command signal including its key ID. When this command signal is received by the transmitter/receiver 2, it is demodulated and applied to the immobilizer ECU 4.

The immobilizer ECU 4 compares the key ID with the registered ID. If the comparison result indicates that the both IDs are in the predetermined relation, the ignition key 1 is determined to be the authorized one and outputs the engine start permission signal and the indication signal indicating that this permission signal is due to manipulation of the ignition key 1. Thus, the immobilizer system is unset (OFF). The immobilizer ECU 4 outputs a command signal to the LED 90 to turn off from flashing after time tC, thereby indicating that the immobilizer system is released (OFF) from the set condition (ON).

When the ignition key 1 is further turned to the starter-on position, the starter switch 2 turns on and supplies the electric current to drive the starter motor 70. With the engine start permission signal from the immobilizer ECU 4, the engine ECU 5 controls the injection device 61 and the ignition device 62 to supply fuel and ignition spark to the engine 60, which is cranked by the starter motor 70. Thus, the engine 60 is started from time tC. With the indication signal indicating that the engine start permission is due to the manipulation on the ignition key 1, the engine ECU 5 also permits the operation of the shift controller 63, which responsively permits the vehicle travel after time tC.

On the other hand, when the remote controller 31 is manipulated at time tA without inserting the ignition key, 1 into the key cylinder 1A under the condition that the immobilizer system is in the set condition (ON), the remote controller 31 transmits the engine start command signal including the ID. The engine starter controller 3 receives this engine start command signal and compares the received ID with the stored ID. When these IDs are in the predetermined relation, the starter controller 3 supplies the electric current to the starter motor 70 to drive the same and outputs the starter signal to the immobilizer ECU 4.

The immobilizer ECU 4 receives the starter signal and outputs to the engine ECU 5 the engine start permission signal and the indication signal indicating that this permission signal is due to the manipulation of the remote controller 31. Thus, the immobilizer system is released (unset; OFF) from the set condition (ON) at time tA. With this engine start permission signal, the engine ECU 5 drives the injection device 61 and the ignition device 62 to start the engine 60 at time tA in the similar manner as the engine 60 is started by the ignition key 1 at time tC.

In this situation, however, the engine ECU 5 continues to prohibit the operation of the shift lock controller 63 so that the vehicle is prohibited from traveling even if the engine 60 is started. This vehicle travel prohibition is continued until when the ignition key 1 is inserted into the key cylinder 1A, that is, until the indication signal indicating that the start permission signal is output due to the manipulation of the ignition key 1. As long as the vehicle travel is prohibited, the immobilizer ECU 4 drives the LED 90 to flash to indicate that the vehicle cannot be moved.

This continued prohibition of the vehicle travel in spite of the engine operation by the remote controller 31 is advantageous in that the vehicle is stolen by an unauthorized person by breaking a vehicle window or door, when the authorized person using the remote controller 31 is not near the vehicle. Further, the flashing of the LED 90 is advantageous to indicate that the vehicle travel is prohibited.

In the above operation in which the engine 60 is started by the remote controller 31, the immobilizer ECU 4 preferably outputs the engine start prohibition signal to the engine ECU 5 to stop engine operation, when the body ECU 81 outputs a detection signal indicating opening or unlocking of a door detected by the switch 82 or 83 or a transmission shift lever operation, which is representative of activity to move the vehicle. This engine stop effectively protects the vehicle from being stolen by the unauthorized person. After the engine 60 is stopped, the engine 60 can be started again and the vehicle can be moved by inserting the ignition key 1 into the key cylinder 1A as described above (time tC).

The above embodiment may be modified in many ways.

For instance, the set condition (ON) of the immobilizer system may be indicated by any other devices than the LED 90. For instance, a flat panel display such as a LCD may be used to indicate the set condition (ON) in visual message.

The indication of the set condition of the immobilizer system by, for instance LED 90, may be controlled not by the immobilizer ECU 4 but by the starter controller 3 or the engine ECU 5. That is, the LED 90 may be driven to flash by the starter controller 3 or the engine ECU 5 when the engine 60 is started by the remote controller 31.

Further, the ignition key 1 may be an electronic smart key other than a mechanical key. The electronic smart key is used in a smart entry system of a vehicle, so that it transmits a response signal including its ID in response to a request signal from a transmitter of a vehicle security system.

What is claimed is:

1. A remote engine starting system for starting an engine of a vehicle, the system comprising:
    a first communication device for receiving an engine start command signal transmitted from a portable transmitter held by a user;
    a second communication device for receiving an engine start command signal transmitted from a transmitter provided in a vehicle key;
    an engine control means for permitting and prohibiting an engine starting in response to the engine start command signal received by the first communication device or the second communication device;
    a determination means for determining whether the engine is started by the engine start command signal received by the first communication device or the second communication device, when the engine is started by the engine control means; and
    an indication means for indicating a vehicle travel prohibition when the engine starting is prohibited by the engine control means, the indication means providing an indication of the vehicle travel prohibition when the engine is started in response to the engine start command signal received by the first communication device without the engine start command signal received by the second communication device, and the indication means stopping the indication of the vehicle travel prohibition when the engine is started in response to the engine start command signal received by the second communication device.

2. The remote engine starting system as in claim 1, wherein:
    the engine control means commands the indication means to indicate the vehicle travel prohibition when the engine is started in response to the engine start command signal received by the first communication device; and
    the indication means stops the indication of the vehicle travel prohibition when the engine is started by the engine control means, and indicates the vehicle travel prohibition when the engine control means commands the indication means to indicate the vehicle travel prohibition.

3. The remote engine starting system as in claim 1, wherein:
    the second communication device transmits a transmission request signal, which requests the vehicle key to transmit the engine start command signal.

4. The remote engine starting system as in claim 1, wherein:
    the engine start command signals of the portable device and the vehicle key include therein specific identification information; and
    the engine control means checks whether the portable device or the vehicle key is an authorized one based on the identification information, and starts the engine when a check result indicates the authorized one.

5. The remote engine starting system as in claim 1, wherein:
    the indication means includes a light emitting device that is driven to emit light for indicating the vehicle travel prohibition.

6. The remote engine starting system as in claim 1, wherein:
    the indication means includes a display device that is driven to provide a visual message indicating the vehicle travel prohibition.

7. The remote engine starting system as in claim 1, further comprising:
    a vehicle travel control means for permitting and prohibiting travel of the vehicle,
    wherein the determination means provides an indication signal, which indicates whether the start command signal is received by the first communication device or the second communication device, so that the vehicle travel control means permits the travel of the vehicle and the indicator means stops the indication of the vehicle travel prohibition only after the indication signal is provided.

8. The remote engine starting system as in claim 1, wherein:
    an immobilizer system of the vehicle is unset when the engine is started in response to any of the engine start command signals received by the first communication device and the second communication device.

9. A remote engine starting method for a vehicle, the method comprising:
    receiving an engine start command signal;
    starting an engine of the vehicle in response to the engine start command signal;
    determining whether the engine start command signal is transmitted at an outside of the vehicle or at an inside of the vehicle;

controlling travel of the vehicle based on a determination result, so that the vehicle travel is prohibited when the determination result indicates that the engine start command is transmitted at the outside of the vehicle; and unsetting an immobilizer system of the vehicle when the engine is started in response to the engine start command signal, whether the engine start command signal is transmitted at the outside or the inside of the vehicle; and indicating prohibition of the vehicle travel, when the engine is started in response to the engine start command signal transmitted at the outside of the vehicle.

10. The remote engine starting method as in claim 9, further comprising:

transmitting the engine start command signal by either a remote controller held by a user or a transmitter device mounted in the vehicle.

11. A remote engine starting method for a vehicle, the method comprising:

receiving an engine start command signal;

starting an engine of the vehicle in response to the engine start command signal;

determining whether the engine start command signal is transmitted at an outside of the vehicle or at an inside of the vehicle;

controlling travel of the vehicle based on a determination result, so that the vehicle travel is prohibited when the determination result indicates that the engine start command is transmitted at the outside of the vehicle; and stopping the engine when a door of the vehicle is opened after the engine is started in response to the engine start command signal transmitted from the outside of the vehicle.

12. A remote engine starting system for a vehicle, the system comprising:

a receiver for receiving an engine start command signal;

a starter for starting an engine of the vehicle in response to the engine start command signal; and a processing system for performing:

determining whether the engine start command signal is transmitted at an outside of the vehicle or at an inside of the vehicle;

controlling travel of the vehicle based on a determination result, so that the vehicle travel is prohibited when the determination result indicates that the engine start command is transmitted at the outside of the vehicle;

unsetting an immobilizer system of the vehicle when the engine is started in response to the engine start command signal, whether the engine start command signal is transmitted at the outside or the inside of the vehicle; and indicating prohibition of the vehicle travel, when the engine is started in response to the engine start command signal transmitted at the outside of the vehicle.

13. A remote engine starting system for a vehicle, the system comprising:

a receiver for receiving an engine start command signal;

a starter for starting an engine of the vehicle in response to the engine start command signal; and a processing system for performing:

determining whether the engine start command signal is transmitted at an outside of the vehicle or at an inside of the vehicle;

controlling travel of the vehicle based on a determination result, so that the vehicle travel is prohibited when the determination result indicates that the engine start command is transmitted at the outside of the vehicle; and stopping the engine when a door of the vehicle is opened after the engine is started in response to the engine start command signal transmitted from the outside of the vehicle.

\* \* \* \* \*